(12) United States Patent
Thielman et al.

(10) Patent No.: US 7,963,350 B1
(45) Date of Patent: Jun. 21, 2011

(54) SPHERICAL ARMORED MOBILE PLATFORM

(75) Inventors: Benjamin-Fausto S. Thielman, Fredericksburg, VA (US); Gerhard W. Thielman, Spotsylvania, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 245 days.

(21) Appl. No.: 12/386,179

(22) Filed: Apr. 10, 2009

(51) Int. Cl.
*B62D 55/04* (2006.01)
(52) U.S. Cl. .......................... 180/7.1; 280/206
(58) Field of Classification Search ............... 180/7.1, 180/10; 280/206, 207
See application file for complete search history.

(56) References Cited

U.S. PATENT DOCUMENTS

| | | | |
|---|---|---|---|
| 1,915,886 A | | 6/1933 | Gutierrez |
| 2,107,766 A | | 2/1938 | Rose ............................. 180/10 |
| 2,267,254 A | * | 12/1941 | Reilley .......................... 180/21 |
| 3,428,015 A | * | 2/1969 | Cloud ............................ 441/78 |
| 3,905,323 A | * | 9/1975 | Kacere ........................ 114/39.23 |
| 4,386,787 A | | 6/1983 | Maplethorpe et al. ........ 280/206 |
| 4,729,446 A | * | 3/1988 | Sefton ........................... 180/21 |
| 6,298,934 B1 | | 10/2001 | Shteingold ..................... 180/10 |
| 7,767,335 B2 | | 8/2010 | Sharrow et al. ............... 429/156 |
| 2007/0059591 A1 | | 3/2007 | Sharrow et al. ............... 429/156 |

* cited by examiner

*Primary Examiner* — Kevin Hurley
(74) *Attorney, Agent, or Firm* — Gerhard W. Thielman, Esq.

(57) ABSTRACT

A spherical armored mobile platform (SAMP) is provided for at least one operator to enable protected entry and egress from a militarily hostile environment. The SAMP includes a spherical shell, an armored cockpit and a set of wheels. The spherical shell has inner and outer surfaces and features a plurality of cavities that extend therethrough. The cockpit houses a seat, a guidance controller, a display console, and an electric motor connected to a power supply. The cockpit is contained within said shell. The seat is designed to receive the operator. The wheels are driven by the motor and structurally supported by the cockpit. The wheels engage the inner surface and turn in response to the motor. The cavities are disposed within three-sided boundaries of a geodesic dome. The SAMP can further include a plurality of optical sensors disposed on the cockpit, and a signal integrator to present temporally concatenated visual signals into a mosaic at the display console. The SAMP can also include a projectile-firing gun mounted to the cockpit, and a trigger control to enable actuation of the gun in response to the projectile exiting the sphere at an instance that coincides with a cavity of the plurality of cavities. The SAMP includes a steering mechanism that turns orientation direction of the fore lower and aft upper wheels. The SAMP includes a door on the cockpit that slides between first open and closed positions, and a hatch on the sphere that hinges between second open and closed positions.

14 Claims, 13 Drawing Sheets

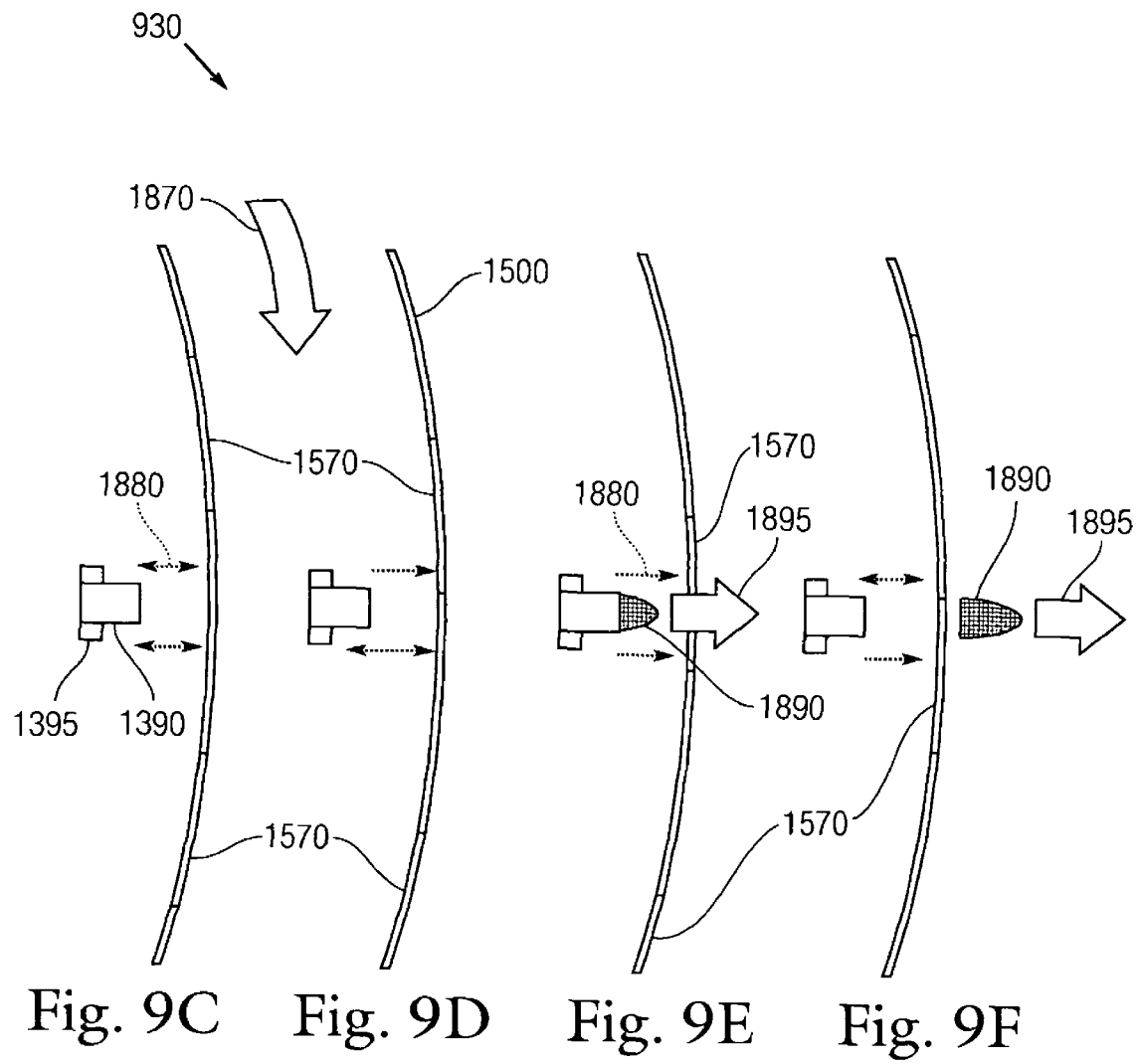

SPHERICAL ARMORED MOBILE PLATFORM

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to mobile armored platforms. In particular, this invention describes damage-resistant personal transport vehicles.

Currently deployed armored personnel carriers are designed to ferry members of the armed services from a staging area to an engagement zone at which hostile enemy action can be encountered. Such troops may disembark from their carrier to conduct their mission. Under select circumstances, a small unit of uniformed personnel may be assigned to investigate a cluttered (e.g., urban) setting in which enemy combatants may be concealed. Such personnel may be dangerously exposed thereby to hostile crossfire.

SUMMARY

Conventional personnel carriers yield disadvantages addressed by various exemplary embodiments of the present invention. Such carriers provide minimal protection from hostile attack after egress therefrom, beyond fire support. A self-propelled delivery mechanism that provides armor and weapons for infantry can aid in close-quarter combat. In particular, a spherical armored mobile platform (SAMP) is provided herein as a transport for a person into a militarily hostile environment.

Various exemplary embodiments provide a spherical armored mobile platform (SAMP) for at least one operator to enable protected entry and egress from a militarily hostile environment. The SAMP includes a spherical shell, an armored cockpit and a set of wheels. The spherical shell has inner and outer surfaces and features a plurality of cavities that extend therethrough. The cockpit houses a seat, a guidance controller, a display console, and an electric motor connected to a power supply. The cockpit is contained within said shell. The seat is designed to receive the operator.

In various exemplary embodiments, the wheels are driven by the motor and structurally supported by the cockpit. The wheels engage the inner surface and turn in response to the motor. The cavities are disposed within three-sided boundaries of a geodesic dome. The SAMP can further include a plurality of optical sensors disposed on the cockpit, and a signal integrator to present temporally concatenated visual signals into a mosaic at the display console. The SAMP includes a steering mechanism that turns orientation direction of the fore lower and aft upper wheels.

In various exemplary embodiments, the SAMP can also include a projectile-firing gun mounted to the cockpit, and a trigger control to enable actuation of the gun in response to the projectile exiting the sphere at an instance that coincides with a cavity of the plurality of cavities. The SAMP includes a door on the cockpit that slides between first open and closed positions, and a hatch on the sphere that hinges between second open and closed positions.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIGS. 9C through 9F are elevation detail views of a sensor-restrained firing operation;

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Various exemplary embodiments of the spherical armored mobile platform (SAMP) are described with reference to the drawings. The SAMP provides concentric shells, the inner to provide protective armor for an occupant, and the outer to enable self-propelled locomotion along a terrain. The spherical armored mobile platform for single operator navigation (SAMPSON) represents a preferred embodiment of the SAMP. The SAMPSON provides room for a single occupant as driver, navigator, and weapons operator from inside the inner shell or cockpit.

The SAMP includes an outer spherical shell (or roller ball) that includes through-cavities and an inner shell (or cockpit) that provides armor protection. The roller ball forms a hollow sphere. The cockpit forms a hollow oblate spheroid. Between the shells are upper and lower wheel chasses. The cockpit has an aft hatch that slides forward. The roller ball has at least two hatches that open outward. The cockpit includes a reclined seat, an instrument display and a control unit. The SAMP can incorporate firing weapons, such as the M2 Browning Machine Gun (BMG) that fires 50 caliber rounds, and the M240 (or earlier M60) machine gun that fires 7.62×51 mm NATO cartridges.

Figure 1:
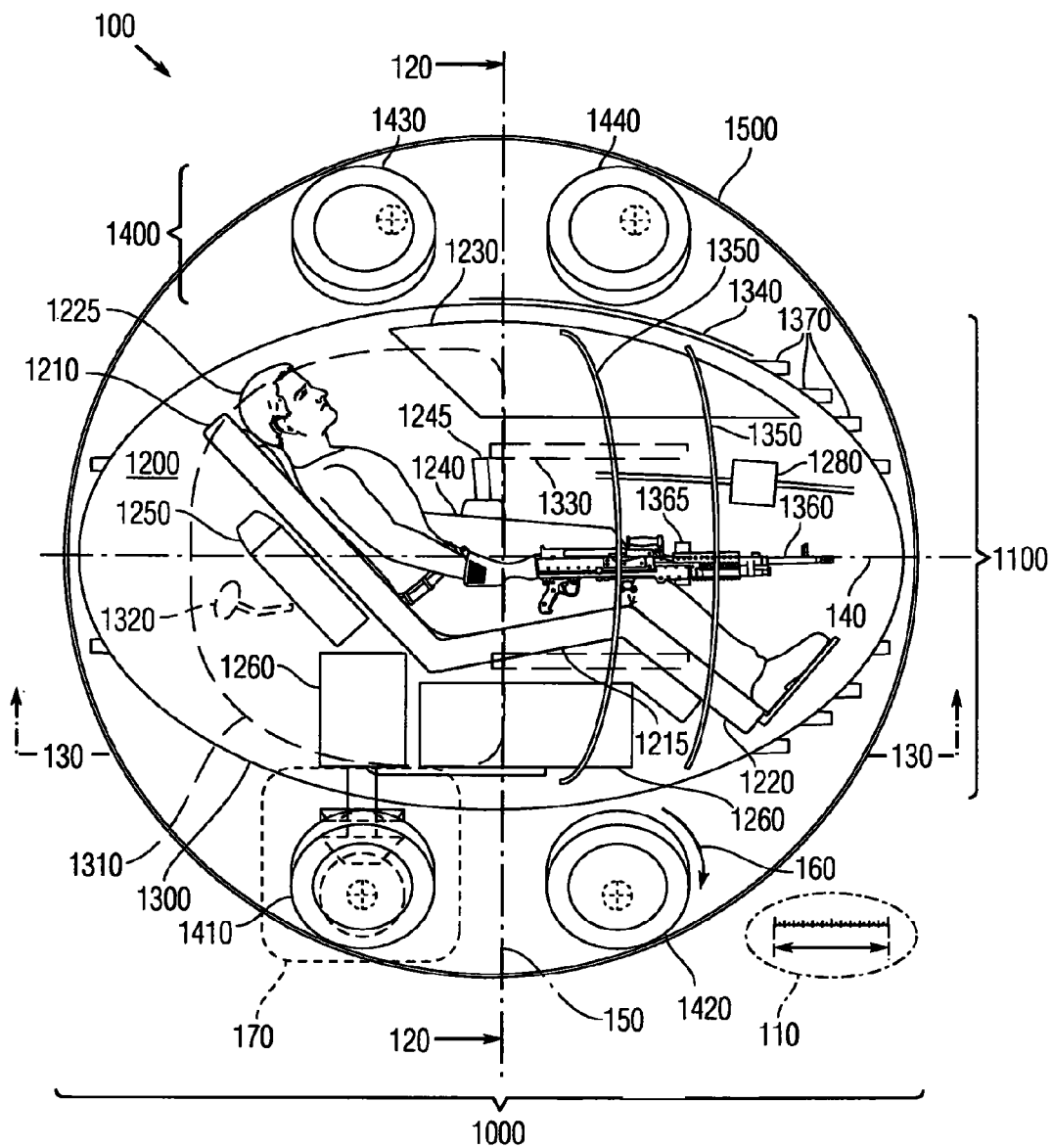
FIG. 1 is a first starboard elevation view of an armored platform.
Figure 2:
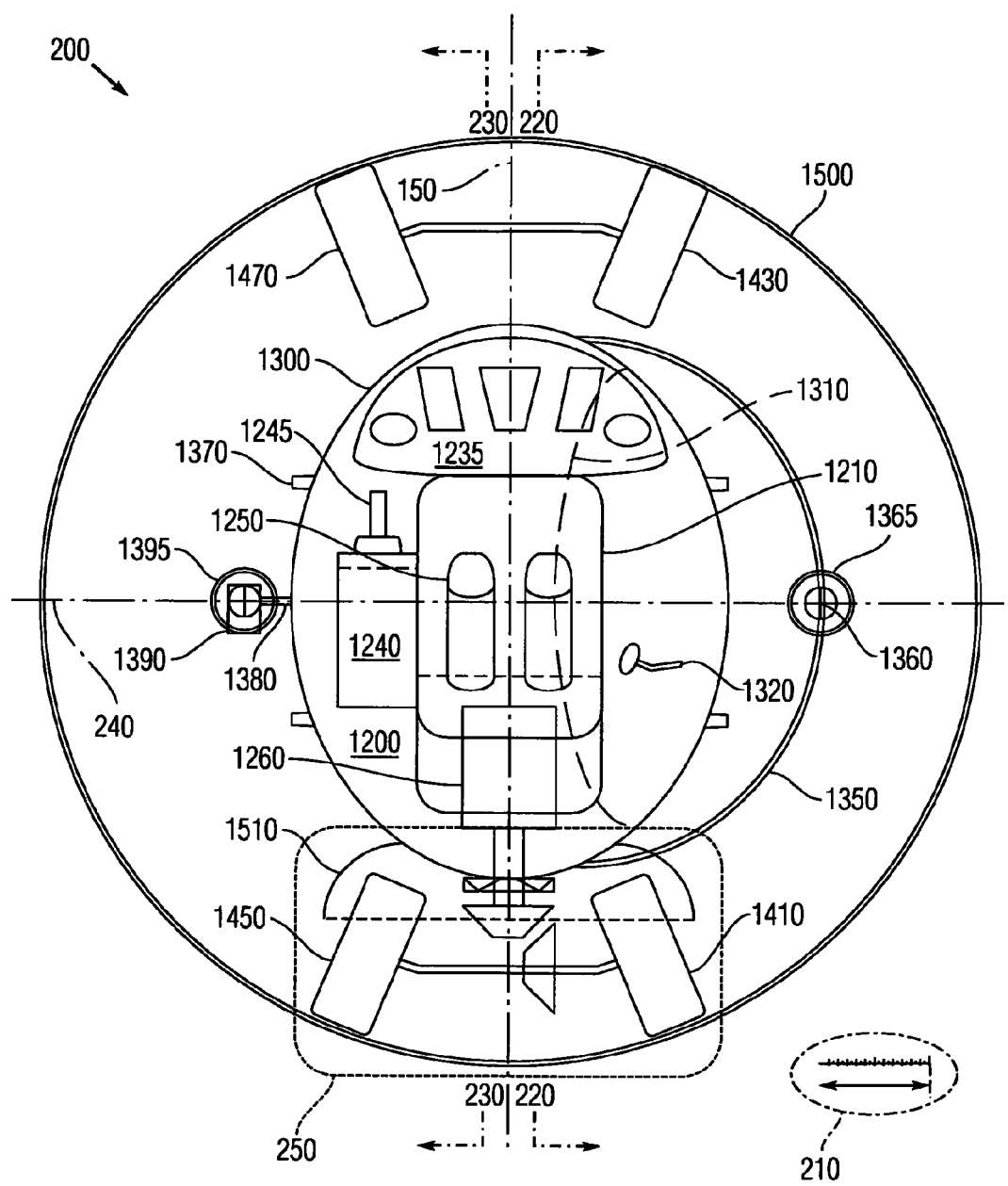
FIG. 2 is an aft elevation view of the armored platform.
Figure 3:
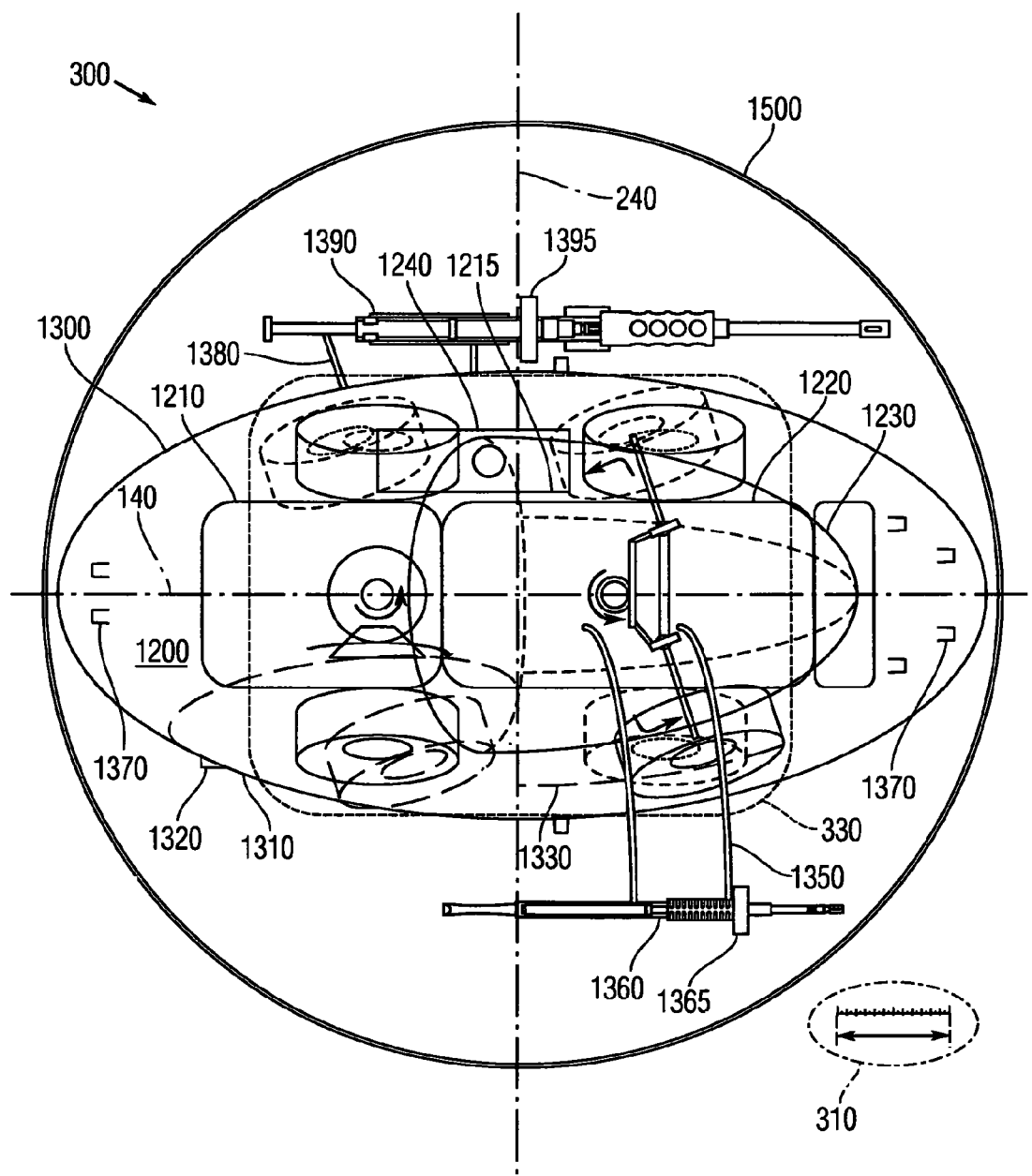
FIG. 3 is a plan view of the armored platform.
Figure 4:
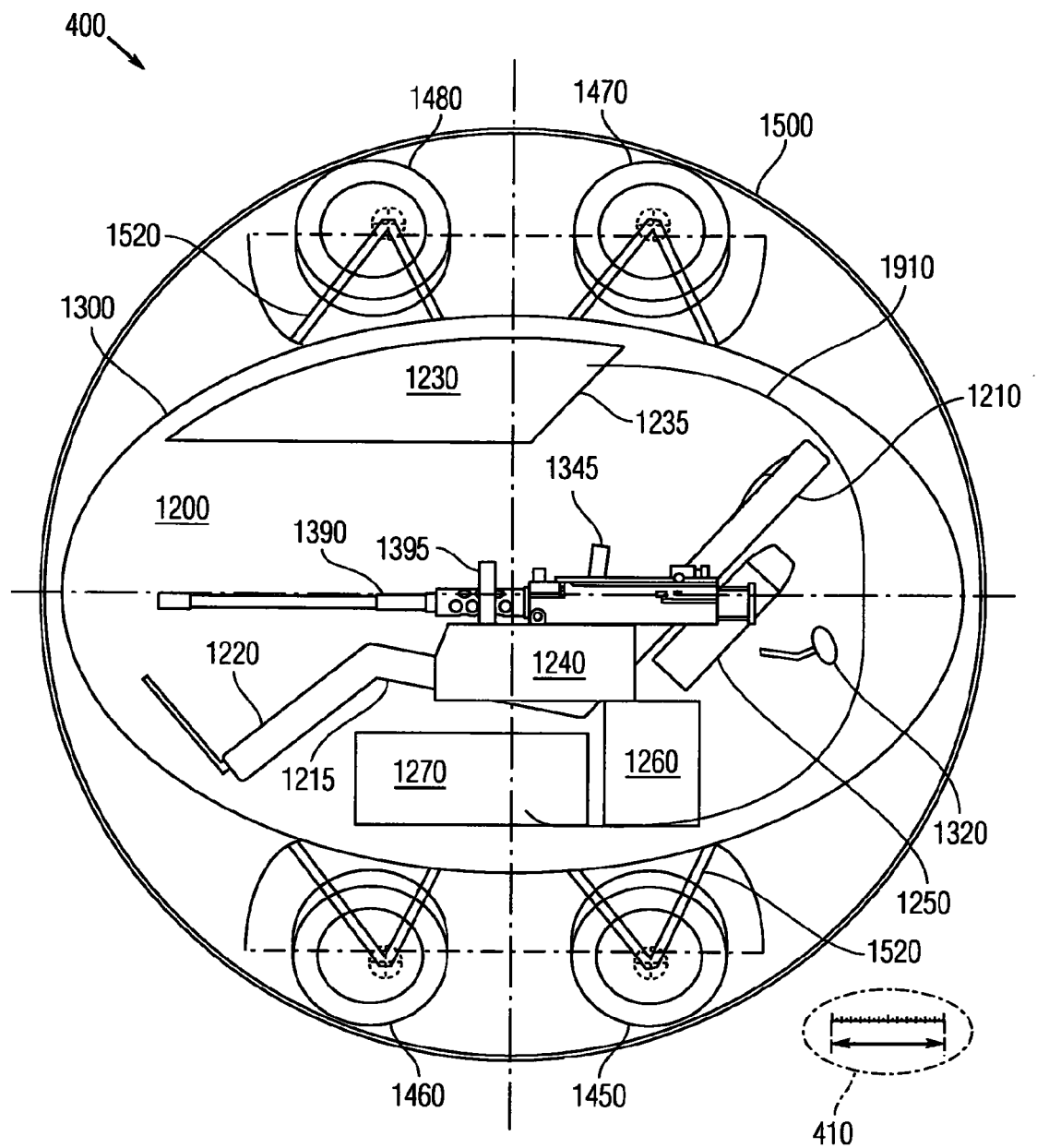
FIG. 4 is a port elevation view of the armored platform.

FIGS. 1 through 6 show various views of the SAMPSON in approximate scale. FIG. 1 presents a starboard elevation view 100 with scale-rule 110, aft section 120, upper section 130, axial centerline 140, vertical centerline 150, rotational arrow 160 and first view portion 170 (of a torque transfer system). The scale-rule 110 denotes approximately one foot in length. FIG. 2 presents an aft elevation view 200 with scale-rule 210, respective starboard and port sections 220 and 230, lateral centerline 240 and second view portion 250. FIG. 3 presents a plan view 300 with scale-rule 310, aft section 230 and third view portion 330. FIG. 4 presents a port elevation view 400 with scale-rule 410.

Figure 5A:
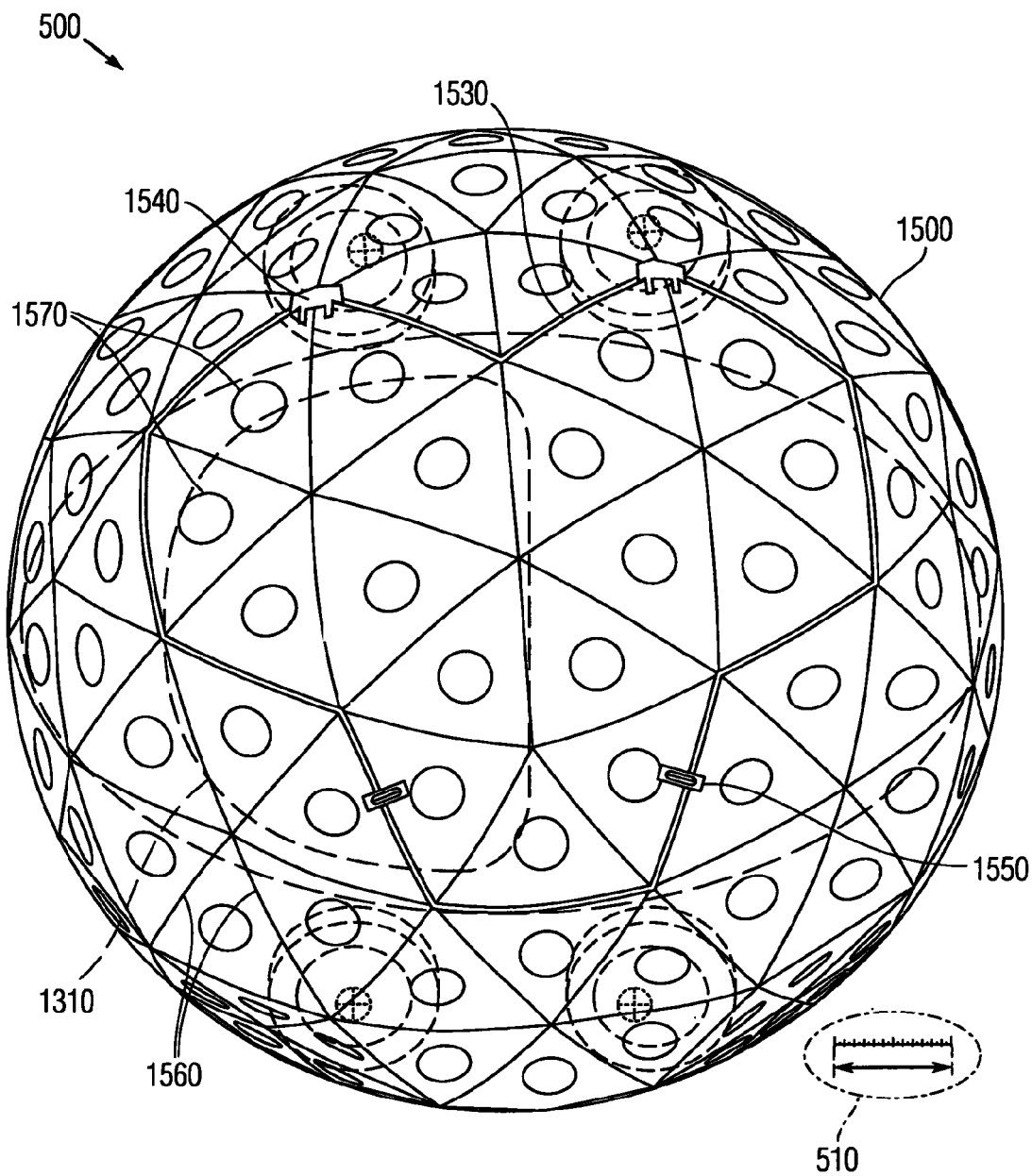
FIG. 5A is a second starboard elevation view of the armored platform.
Figure 5B:
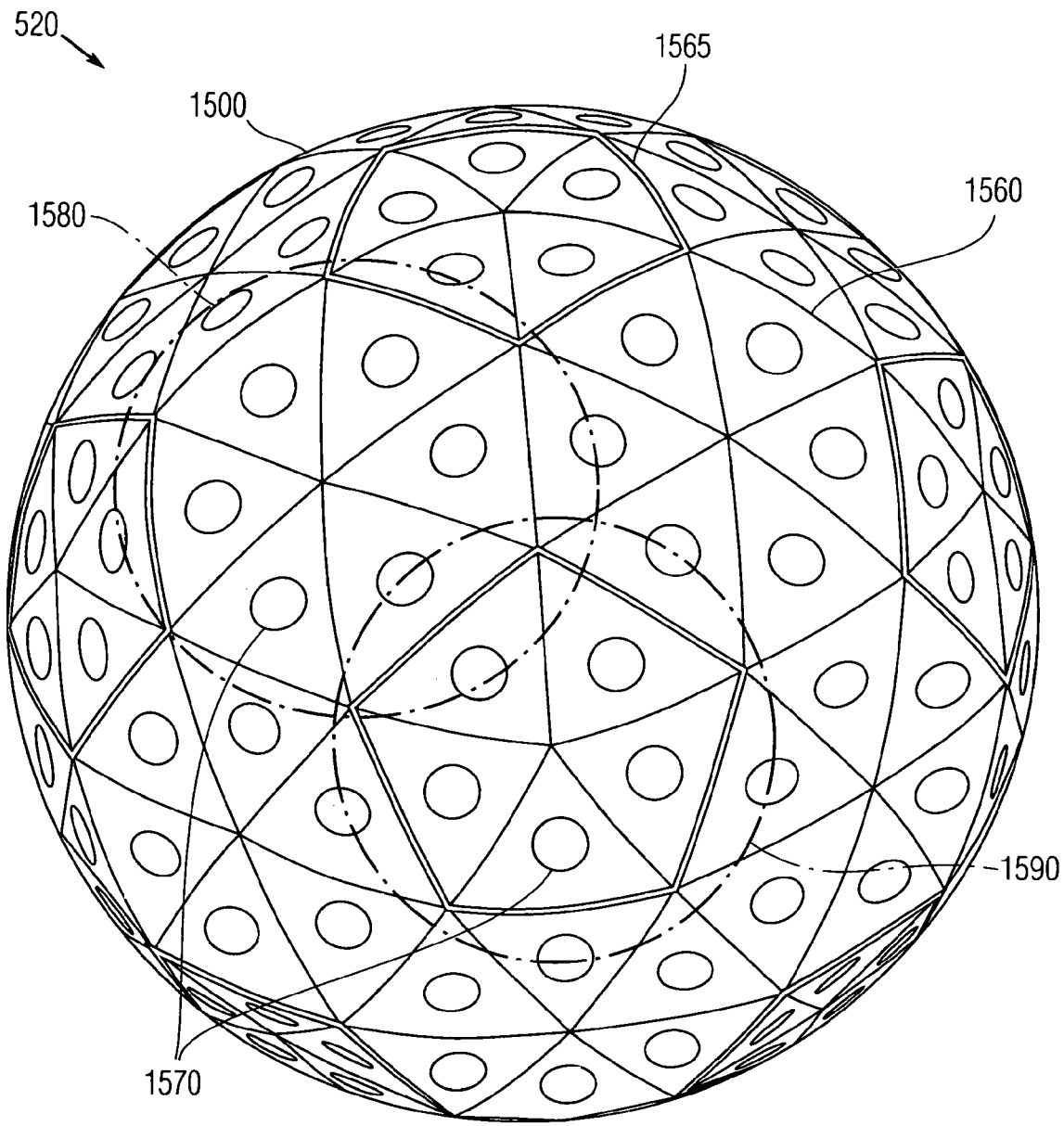
FIG. 5B is a third starboard elevation view of the shell exterior.
Figure 6:
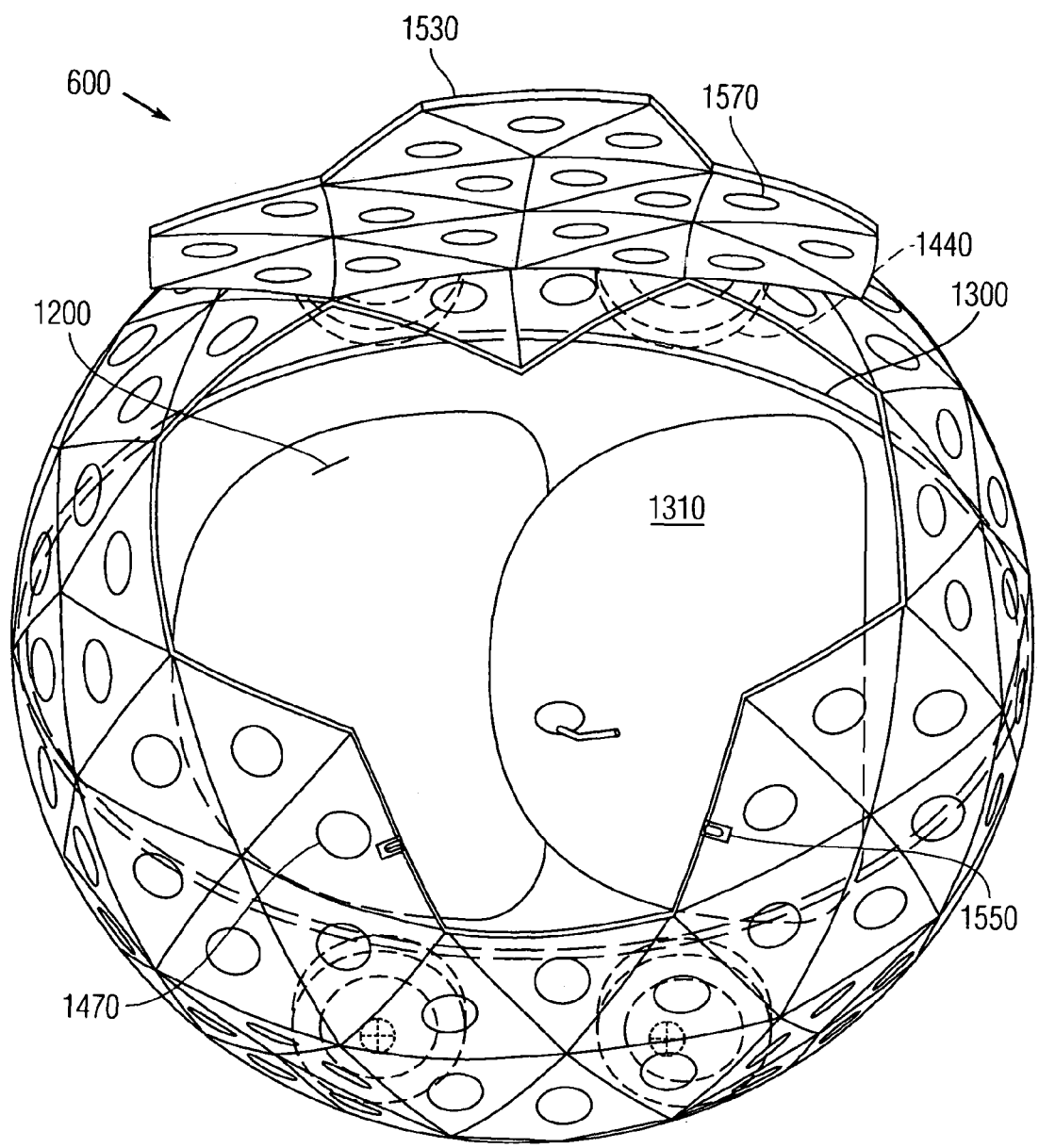
FIG. 6 is a fourth starboard elevation view of the armored platform.
Figure 7:
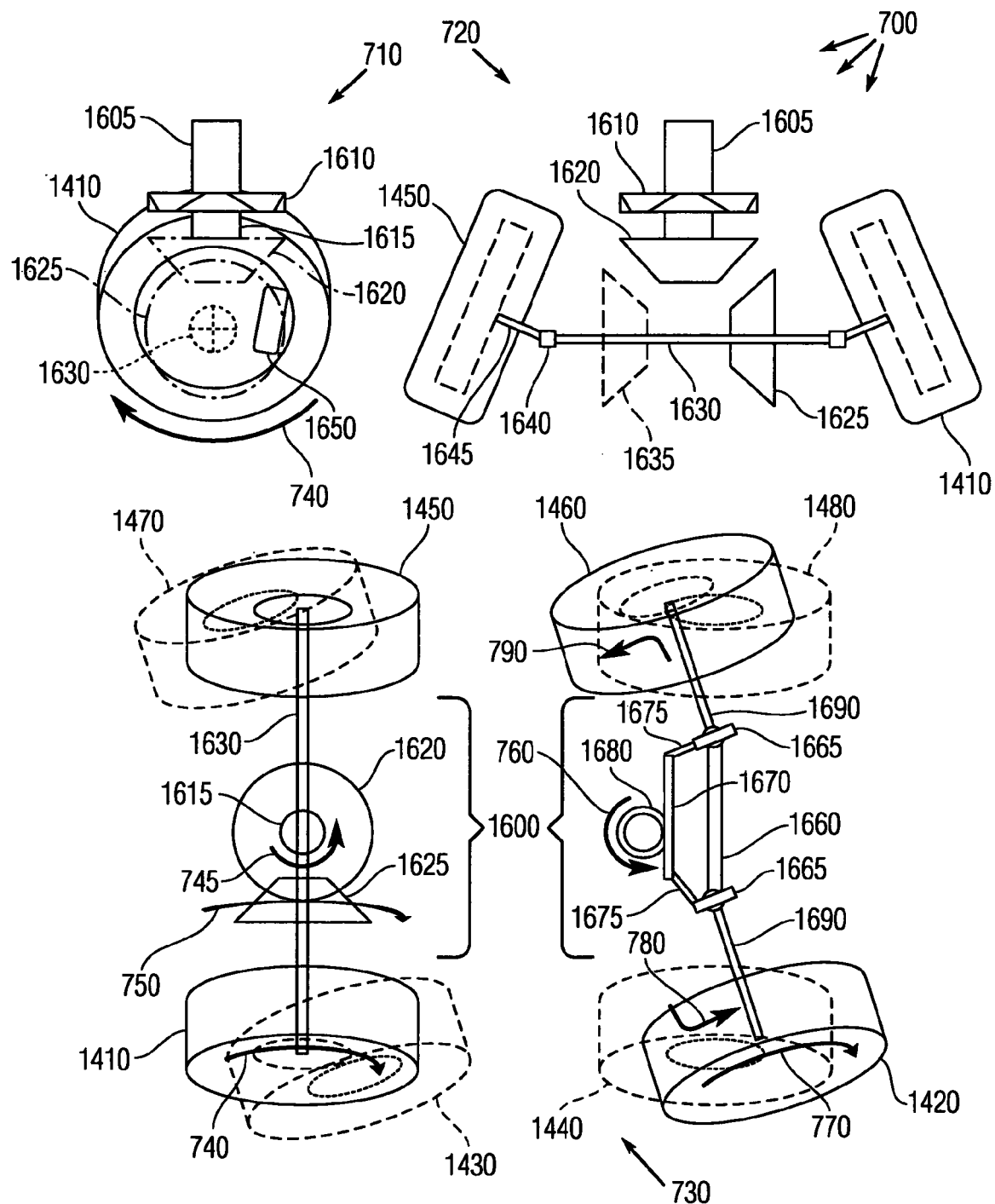
FIG. 7 is a detail view of locomotion components for the armored platform.

FIG. 5A presents a second starboard elevation view 500 with scale 510, and FIG. 5B similarly presents a third starboard elevation view 530. FIG. 6 presents a fourth starboard elevation view 600 in an open configuration. FIG. 7 presents detail component views 700 including a starboard elevation view 710 of view portion 170, an aft elevation view 720 of view portion 240, and a plan view 730 of view portion 330. The views 700 also include rotation arrows 740, 745, 750, 760 and 770, and turn arrows 780 and 790.

Figure 8A:
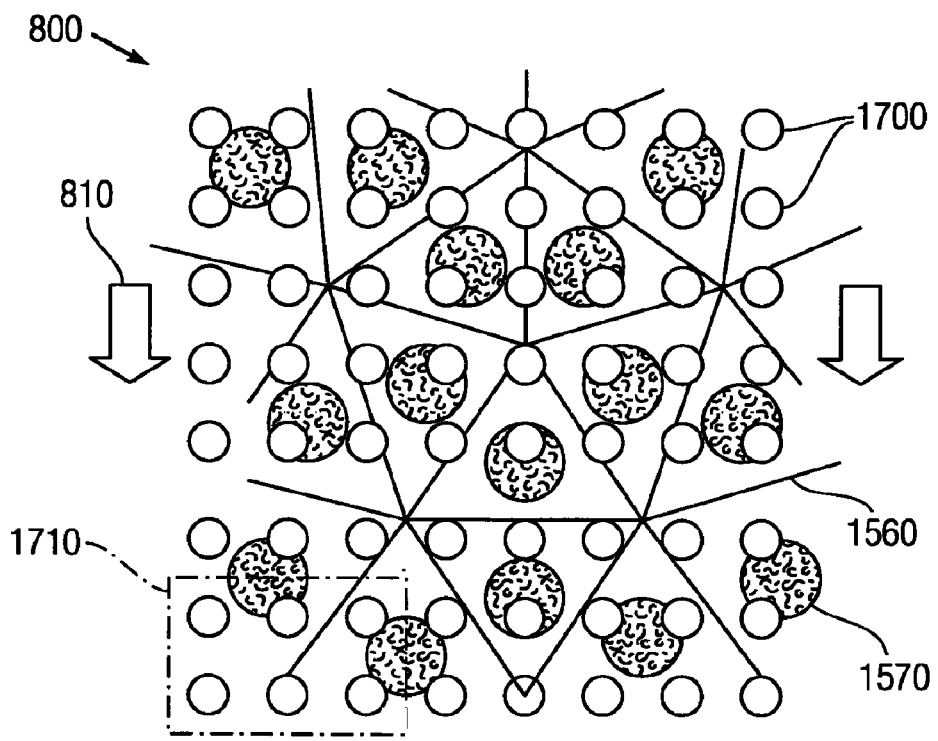
FIG. 8A is a transform view of a visual display system.
Figure 8B:
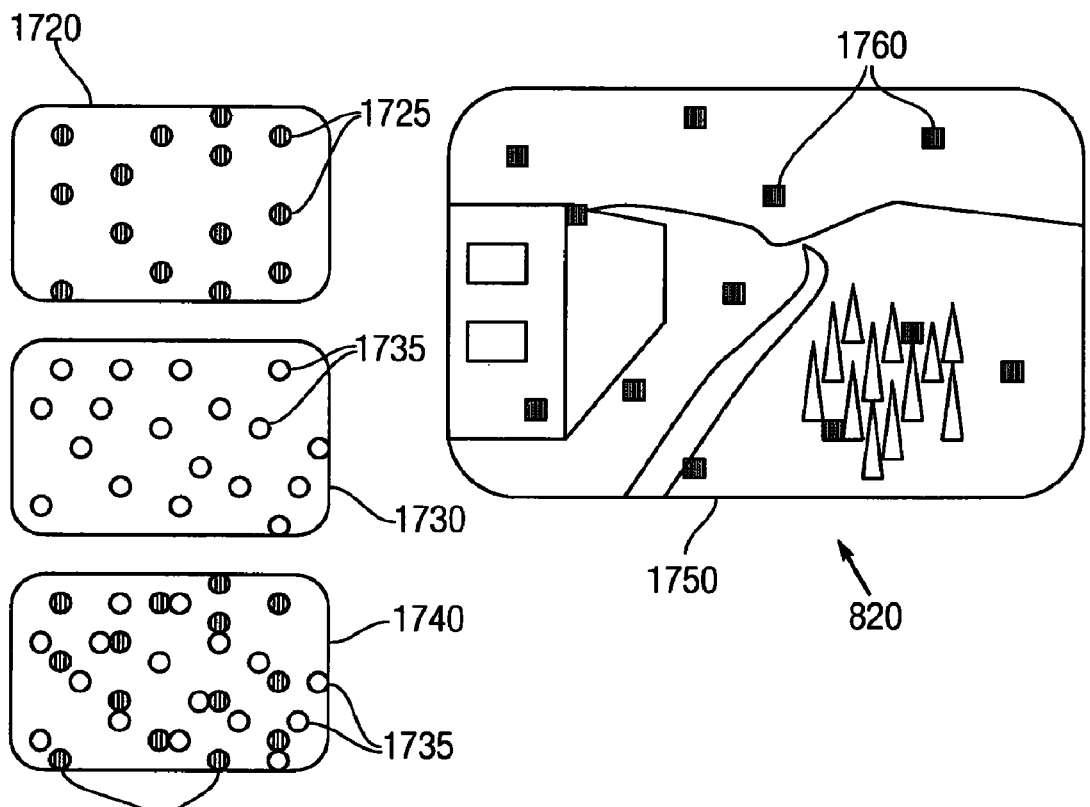
FIG. 8B is a representational view of the visual display.
Figure 9A:
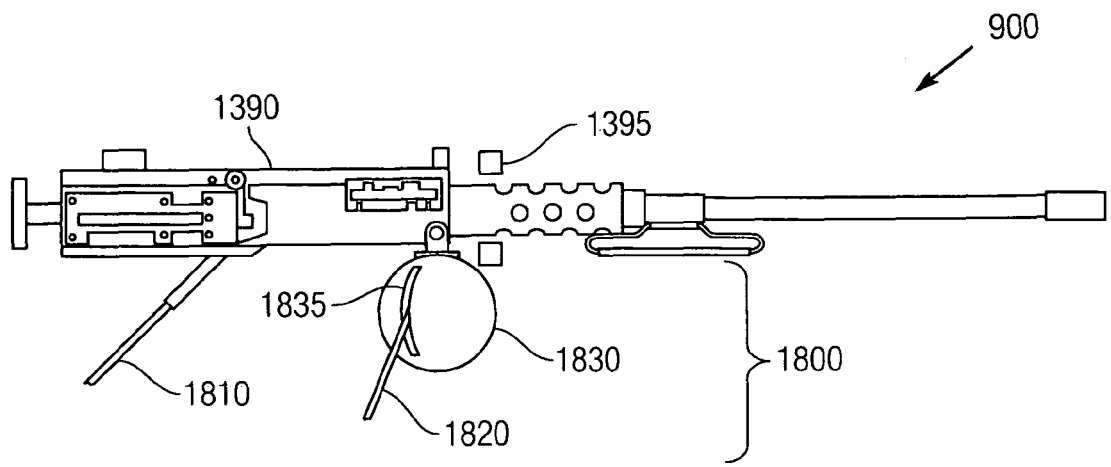
FIG. 9A is a detail view of a swivel-and-aim system.
Figure 9B:
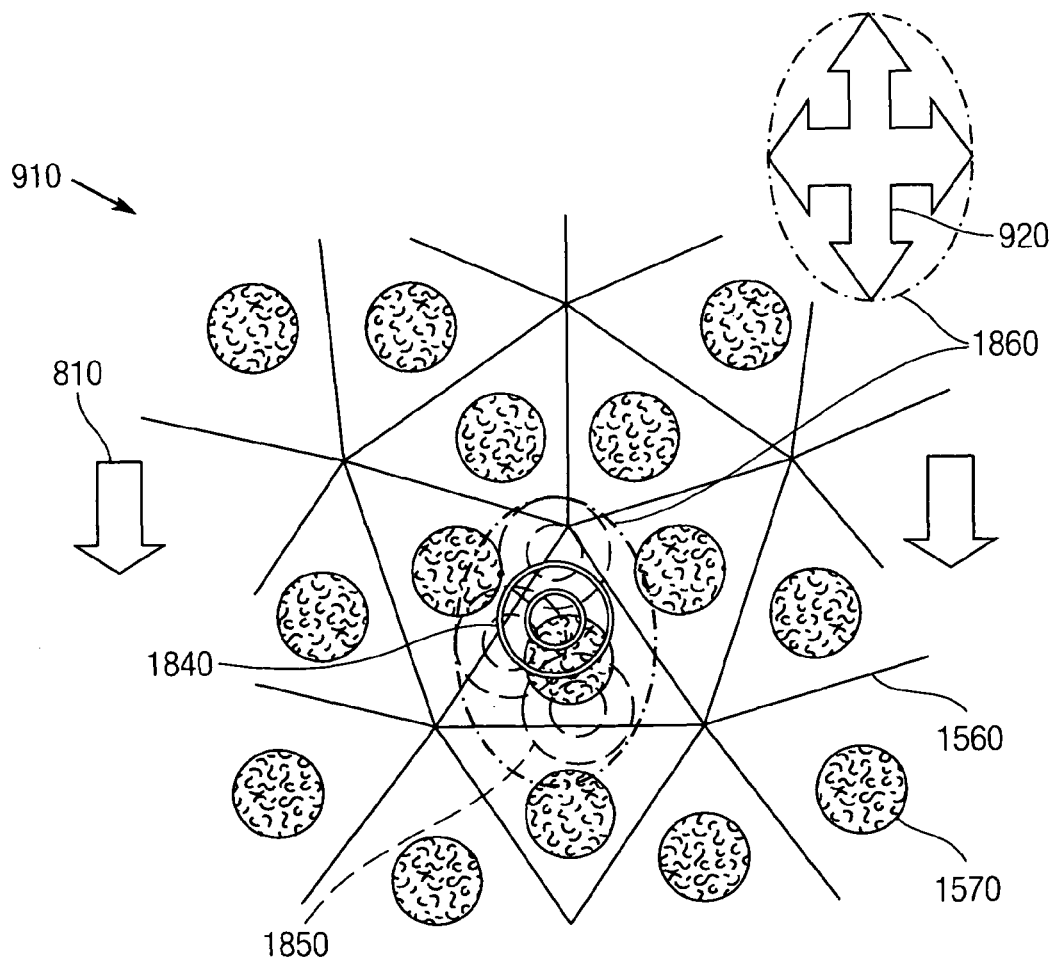
FIG. 9B is a transform view of the swivel-and-aim system.
Figure 10:
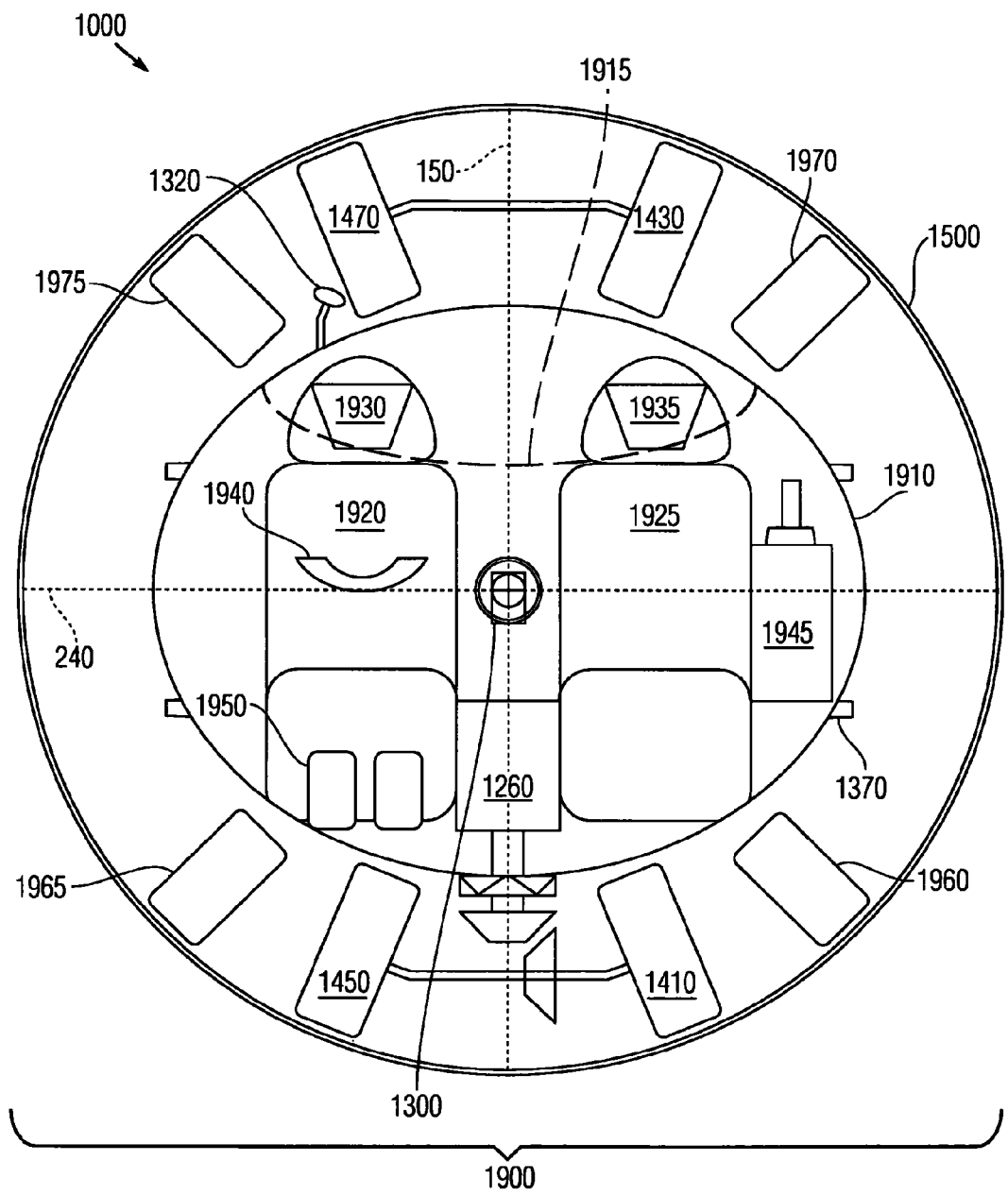
FIG. 10 is a fore elevation view of a two-operator version of the armored platform.
Figure 11:
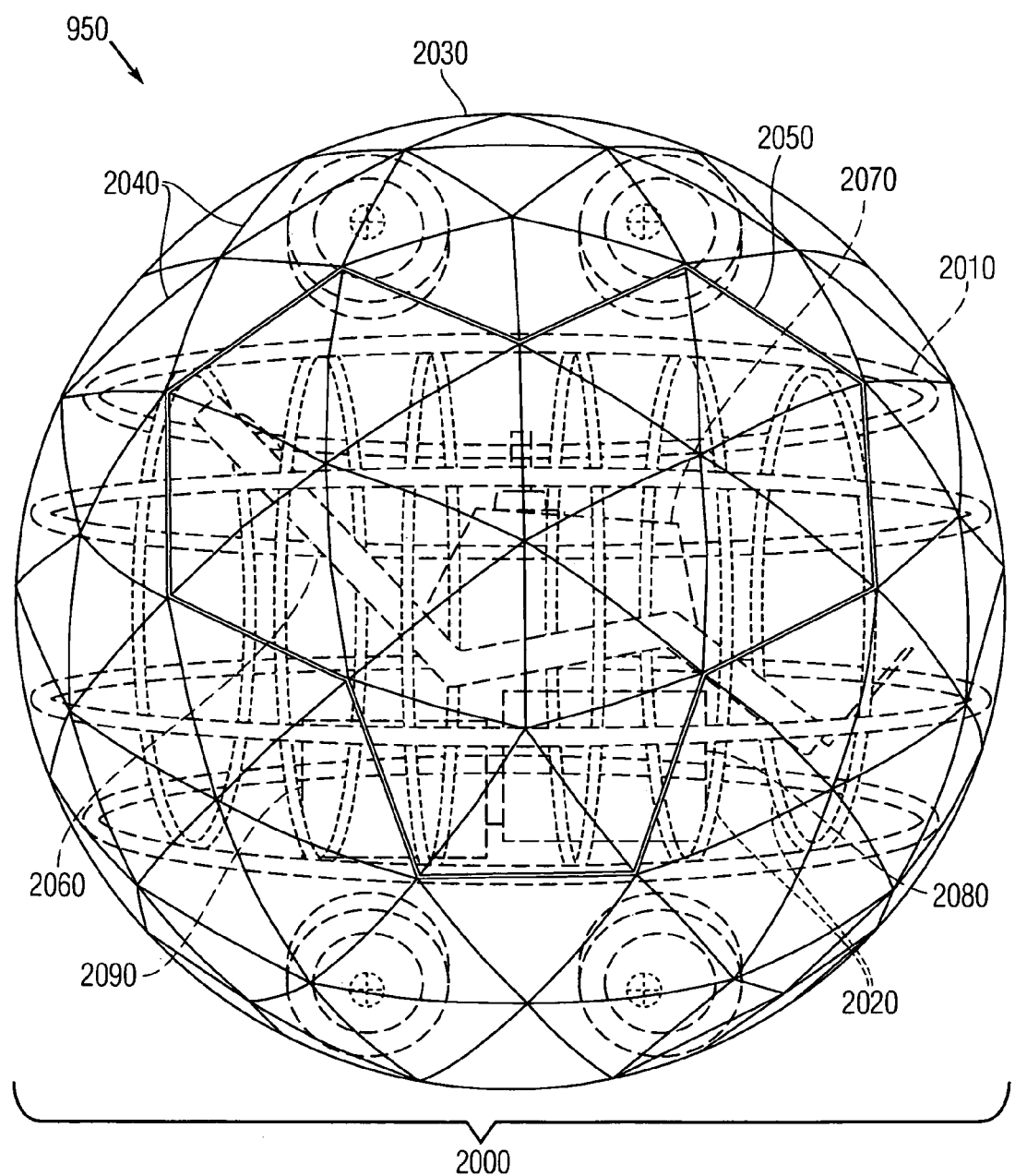
FIG. 11 is a fifth starboard elevation view of a recreational vehicle.

FIG. 8A presents a representational view 800 of the ball interior in planar transposition, with an arrow 810 denoting ball rotation direction. FIG. 8B presents representational images 820 of the cockpit display from within the roller ball. FIG. 9A presents a detail elevation view 900 of the M2 BMG and slewing brackets. FIG. 9B presents a representational view 910 of the ball interior in planar transposition (from proximate along the centerline axis), with slew compass 920. FIGS. 9C through 9F present a detail elevation view 930 of gunfiring restriction. FIG. 10 shows a fore elevation view 940 of a two-operator version of the SAMP. FIG. 11 provides a fifth starboard elevation view 950 of a recreational version of the vehicle.

In FIG. 1, the starboard view 100 shows a SAMPSON (or mobile platform) 1000 containing a cockpit 1100 that defines an interior 1200. A reclined seat or couch is disposed within the cockpit interior 1200 along the longitudinal direction parallel to the axial centerline 140. The couch includes a back brace 1210, a seat 1215 and a leg rest 1220 with which to support an operator 1225. The interior 1200 further includes a display console 1230 that provides an instrument monitor 1235 (in FIG. 2), a guidance unit 1240 with joystick 1245, oxygen supply tanks 1250, electric motor 1260, and package 1270 that contains batteries and motor controller.

The console 1230 provides storage space is disposed forward of the operator 1225 and provides storage volume for electronics. The instrument monitor 1235 can provide visual information for navigation and weapons targeting, as well as indicators for hatch orientation, battery status, vehicle speed, navigational position, motor torque, etc. The console 1240 provides the control system from which the operator 1225 provides instructions through the joystick 1245 (and/or additional or alternate input devices, such as foot pedals, steering yoke, etc.) for locomotion and weapons discharge. The breathing tanks 1250 (e.g., scuba) support an optional breathing apparatus for the operator 1225 for circumstances in which the interior 1200 is sealed from outside to protect against chemical-biological warfare (CBW) agents. Alternatively, ventilation ports can be incorporated through the cockpit 1100.

The motor 1260 can be a direct current (DC) motor, for example, such as used for electric automobiles that run at 96 volts or 192 volts. Alternatively, the motor 1260 can be an alternating current (AC) motor, for example, a three-phase motor operating at 240 volts. The motor 1260 may optionally be connected to radiation fins to improve heat dissipation.

The package 1270 can include a controller to provide proper voltage to the motor 1260 from a battery supply. Electrical storage can be obtained, for example, from linked 2200-series Nickel-Cadmium (NiCad) cells provided by SR Batteries Inc. at Box 287, Bellport N.Y. 11713. Each cell has a 0.9 inch (23 mm) diameter and 1.69 inch (43 mm) length weighing 2.1 oz (60 g) producing 1.25 volts at 2.2 amp-hours and with 5Ω impedance. These NiCad cells can be concatenated in series as provided in U.S. patent application Ser. No. 11/447,514 and issued as U.S. Pat. No. 7,767,335 in assembly units of 350 volts or 700 volts. Power storage may be augmented transferring braking force to an optional flywheel to recharge the battery.

The 350-volt unit has dimensions of 15.3 inches×13.3 inches×8 inches (389 mm×338 mm×203 mm) and weighs 65 lb (30 kg) composed of eight trays linked in series, with each tray containing thirty-five cells. This can produce electrical energy of 350 (volts)×2.2 (amp-hrs)=770 Watt-hrs=2.77 megaJoules (MJ) or 1.03 horsepower-hour (hp-hr). The 700-volt assembly may combine two 350-volt units with the third dimension being doubled. Assuming peak current of ~30 amps from each 350-volt unit, available power is estimated at ~21 kW (or ~28 hp). Alternate battery configurations can also be contemplated for power supply purposes. For example, the Chevrolet® Volt (with release expected in year 2010) incorporates lithium-ion batteries from LG Chem Ltd. that hold 12 kWh (43.2 MJ or 16.1 hp-hr) of charge and weigh 375 lb (170 kg), which enables travel of up to forty miles without recharge for a vehicle weighing a projected 3140 lb (1430 kg).

The SAMPSON's center of gravity can be adjusted by translatable trim ballast 1280 that controllably slides along at least one interior rail 1285. (Alternatively, such ballast can be contained within the console 1230.) Preferably, the trim ballast 1280 either travels parallel to the axial centerline 140 or comprises a complimentary and independently controllable pair of masses and slider mechanisms disposed along the port and starboard sides of the cockpit 1100. The trim ballast 1280 can be moved and set manually for park positioning or automatically by a drive mechanism to facilitate acceleration of the mobile platform 1000. By shifting the trim ballast 1280 forward, torque demand from the motor 1260 may be reduced, enabling the mobile platform 1000 to move forward and/or to clear a ground obstacle.

The cockpit 1100 is contained by an oblate spheroid shell 1300 that includes an access door 1310 equipped with a handle 1320 that extends both into the interior 1200 and external to the spheroid 1300. As depicted herein, the door 1310 is disposed towards the aft starboard side and opens by sliding forward along racers 1330. Similarly, the trim ballast 1280 may traverse along external rails 1340, such as along the top of the spheroid 1300, either in substitution of or in addition to the interior rails 1285. Artisans of ordinary skill will recognize that alternate arrangements and bilateral geometries that fit into the outer shell may be contemplated without departing from the invention's scope.

Bars 1350 extend from beyond continuous travelling positions of the door 1310 to support a medium machine gun 1360 (e.g., M60) that fires 7.62 mm rounds. The gun 1360 includes an annular optical view-sight 1365 for sighting from within the ball. Optical sensors 1370 may be disposed along the exterior of the spheroid 1300 for viewing external environmental conditions from within the ball. The sensors 1370 can be miniature digital video cameras. Such a camera can detect photons with a charge-coupled device (CCD) array, for example. FIG. 2 shows brackets 1380 that mount an M2 BMG 1390 with an annular optical view-sight 1395.

As presented for the one-person mobile platform 1000, the cockpit 1100 has approximate exterior dimensions of 84 inches (2.13 m) in length, 38 inches (0.97 m) in width and 56 inches (1.42 m) in height, as observable from the scale-rules 110, 210, 310. For a thickness of 1-inch (25 mm) and composed of stainless-steel (e.g., 304 L with density of 0.29 lb/in$^3$ or 8.03 g/cm$^3$), the cockpit 1100 has an empty (or tear) mass of 2200 lb (1000 kg) based on construction volume of ~7600 in$^3$.

The motor 1260 may be about 150 lb (~70 kg) with batteries being about 130 lb (~60 kg). The M60 gun 1360 is about 42 inches (1.08 m) long and weighs about 23 lb or 11 kg). (By comparison, the M240 gun is about 49 inches or 1.24 m long and weighs about 28 lb or 13 kg.) The M2 BMG (gun) 1390 is 65 inches (1.65 m) long and weighs 84 lb (38 kg). Artisans of ordinary skill will recognize that alternate weapons can be selected for the mobile platform 1000 without departing from the scope of the invention. Additional equipment and auxiliary armor (e.g., under the cockpit 1100 for mine deflection) can also be installed to satisfy specific purposes.

The operator 1225, console 1230, guidance unit 1240, motor 1260, power supply and controller 1270, guns 1360 and 1390, ammunition and auxiliary equipment can be estimated as 1100 lb (~500 kg) yielding 3300 lb (1500 kg) for the gross cockpit mass. For neutral stability, the center of mass of the cockpit 1100 can be optimized as along the lateral centerline 250, below the axial centerline 140 and slightly forward of the vertical centerline 150 by disposition of the package 1270, ballast 1280, ammunition and auxiliary equipment. Artisans of ordinary skill will recognize that these dimensions are merely exemplary and that further engineering may yield more optimal specifications. In addition, a SAMP designed for two or more operators can entail further design changes over the SAMPSON example described.

FIG. 3 shows a set of wheels 1400 mounted to the cockpit 1100 that include aft lower starboard 1410, fore lower starboard 1420, aft upper starboard 1430, fore upper starboard 1440, aft lower port 1450, fore lower port 1460, aft upper port 1470, and fore upper port 1480. The wheels 1400 are each about 15 inches (380 mm) in diameter with a contact width of about 7 inches (178 mm). This width can be extended to improve and homogenize traction.

Each wheel supports about 1320 lb (600 kg) with contact patch, each wheel has an estimated contact patch with the spheroid of 42 in$^2$ (271 cm$^2$), yielding contact pressure of 31 lb/in$^2$ (2.2 kg/cm$^2$). Propulsion torque to the aft lower wheels 1410 and 1450 is provided by the motor 1260. Steerage of the fore lower wheels 1420 and 1460 and the aft upper wheels 1430 and 1470 is provided by steering mechanisms controlled by the joystick 1245, which may also optionally control the guns 1360 and 1390 with supplemental press-keys.

As shown in FIG. 4, the cockpit 1100 and the wheels 1400 are contained within a spherical shell 1500 that constitutes the roller ball. Frictional contact between the wheels 1400 and the sphere 1500 causes the latter to rotate in the same direction as the former. The wheels 1400 are shieldable by a protective skirt 1510 and supported by struts 1520 that preferably incorporate shock absorbers and springs. As shown in FIG. 2, the wheels 1400 are disposed in compression against the sphere's interior (conjunctively both upper and lower) perpendicular to the local surface tangent, to maintain the cockpit 1100 upright without tumbling. The interior surface of the sphere 1500 can be coated with an anti-slip material in conformance with MIL-PRF-24667B for aircraft carrier decks in order to facilitate traction with the wheels 1400.

As shown in FIG. 5A, the sphere 1500 includes at least one hatch 1530 pivotably attached thereto by an external pair of hinges 1540. The hatch 1530 can be secured by internal latches 1550 in the closed position as shown. The sphere 1500 forms a geometry of boundary lines 1560 (that need not be physically denoted) to form a triangular (actually three-side curvilinear) geodesic dome configuration based on a truncated isosahedron.

FIG. 5B distinguishes the lines 1560 and double-lines 1565 that characterize the geodesic dome geometry. The triangles formed by the lines 1560 and 1565 can incorporate cavities or windows 1570, which may be round for example, and denote hexagonal patterns 1580. The double-lines 1565 denote pentagonal patterns 1590 that connect the hexagonal patterns 1580.

FIG. 6 depicts the sphere 1500 with the hatch 1530 disposed open, and the door 1310 slid forward exposing portions of the cockpit interior 1200. The windows 1570 provide viewports through which the optical sensors 1370 and the view-sights 1365 and 1395 can receive visual information from beyond the sphere 1500. The geodesic dome configuration features twelve pentagons 1590 and fifteen hexagons 1580, yielding one-hundred-fifty windows 1570 within the boundaries denoted by lines 1560.

The hatch 1530 can be formed based on a pair of hexagonal patterns 1580 that joins the hinges 1540 and a pentagonal pattern 1590 that engages the latches 1550, which can be recessed to reduce interference from, the wheels 1400. Such a configuration provides opportunity for three such hatches 1530 distributed around the sphere 1500, although alternate configurations can be employed to enable more or fewer such hatches 1530 for entry and egress to the cockpit interior 1200 through the door 1310. Knobs can be disposed at the intersection of the lines 1560, as indicated by positions of the hinges 1540 embedded within, to improve traction along uneven terrain.

For assembly, the sphere 1500 may be constructed from hemispherical sections welded together subsequent to the cockpit 1100 and wheels 1400 being installed therein. Alternatively, the hatch 1530 may be replaced with or augmented by latches for connecting and detaching the hemispherical sections. The sphere 1500 can be estimated as about 44 inches (1.12 m) in radius, or 88 inches or 7⅓ feet (2.24 m) in diameter, with an exemplary thickness of about ⅜ inch (10 mm). The sphere 1500 has an outer area of about 169 ft$^2$ (15.7 m$^2$). For windows 1570 exposing about one-third (⅓) of this area, each window corresponds to a circle having a diameter 8.3 inches (210.7 mm).

Assuming construction of stainless-steel, with one-third of the area open, the sphere 1500 has an estimated mass of 1320 lb (600 kg). The chassis for the steering, propulsion, struts, and wheels, can be estimated as about 660 lb (300 kg). Mass of the platform 1000 can thus be estimated as cockpit ~3300 lb, locomotion ~660 lb, spherical shell ~1320 lb and ballast ~660 lb for a total 5940 lb (2700 kg) or 2.97 tons. As the motor 1260 turns the wheels 1400, the sphere 1500' moves forward from the shifting inertia of the cockpit 1100 with greater mass.

FIG. 7 illustrates detailed views of driving-and-steering mechanisms 1600 related to controllable locomotion of the mobile platform 1000. The first and second detail views 710 and 720 show a shaft 1605 turned by the motor 1260 that engages a clutch 1610 to transfer power to a torque shaft 1615. A vertical axis bevel gear 1620 connected to the torque shaft 1615 turns to engage a counterpart lateral-axis bevel gear 1625 that rotates an aft lower axle 1630 (denoted by cross-haired hash circle). An auxiliary bevel gear 1635 can slide to engage the bevel gear 1620 and concurrently disengage the bevel gear 1625 to provide reverse torque to the axle 1630.

In forward motion, the aft lower starboard wheel 1410 turns clockwise (envisioned from starboard) in the direction of arrow 740. Universal joints 1640 transfer rotational torque from the axle 1630 to angled wheel shafts 1645 so that the outer rim of the wheel can efficiently engage the inner surface of the sphere 1500. A brake 1650 enables stoppage of the wheel 1410. For improved traction, the diameter of the windows 1670 can be reduced and/or the width of the wheels 1400 can be increased.

The detail view 730 illustrates the components 1600 for torque transfer to the aft lower axle 1630, as well as for rack-and-pinion steering for lower fore wheels 1420, 1460. The vertical bevel gear 1620 turns counter-clockwise (from above) shown by rotation arrow 745 to drive the lateral bevel gear 1625 along rotation arrow 750. The lower wheels 1410, 1420, 1450 and 1460 are denoted in solid lines, whereas the upper wheels 1430, 1440, 1470 and 1480 are denoted in dash lines.

The aft upper wheels 1430 and 1470 have complementary steering mechanisms as shown for the fore upper wheels 1420 and 1460 and operate in conjunction together. A link arm 1660 connected to port and starboard universal joints 1665 turn in response to lateral movement of a laterally-moving rack 1670. The joints 1665 can alternatively be replaced with transmission gears. To turn the mobile platform 1000 leftward as shown, a pinion 1680 turns counter-clockwise as denoted by arrow 760 to shift the rack 1670 towards port. This pulls or pushes pivot arms 1675 connecting to the joints 1665 to turn the wheel arms 1690 leftward. This pivots the fore lower starboard wheel 1420 forward as indicated by turn-direction arrow 780, and also pivots the fore lower port wheel 1460 aft as indicated by turn-direction arrow 790. Similarly, the mobile platform 1000 pivots rightward by opposite shift of the rack 1670 towards starboard.

FIG. 8A provides a planar transform view 800 of a visual display system. A lattice of triangles demarcated by lines 1560 defines the interior surface of the sphere 1500. Window cavities 1570 are disposed within the geodesic triangle boundaries that enable limited observation beyond the sphere 1500 from within, although other patterns can be contemplated. From the front vantage, as the mobile platform 1000 rolls forward, the lines 1560 and corresponding windows 1570 translate downward as indicated by arrow 810 (with the lattice depicted flat). Visual imagery signals 1700 from the optical sensors 1370 can be combined in matrix form 1710. Because the signals 1700 are substantially occluded by the sphere 1500 except through the windows 1570, only intermittent visual imagery can be available at those intervals in which a sensor 1370 has a line-of-sight through a window 1570 as the sphere 1500 rolls along.

These signals 1700 can be temporally integrated by conditioning an image update in response to receipt of a non-occluded image, which can be identified by substantially undifferentiated background. FIG. 8B provides a representational view 820 of the visual display from the instrument monitor 1235. A first constructed image 1720 from the lattice 1710 presents first intermittent pixels 1725 obtained from signals 1700 at a first instant. A second constructed image 1730 presents second intermittent pixels 1735 at a second instant, such as during a turn.

Maintaining the latency of both first and second pixels 1725 and 1735 to present together forms a more complete image 1740 than those individually constructed. After many such instances in which images have been combined, an external environment mosaic image 1750 can be constructed with minimal obscuration of information from lacunae pixels 1760 that indicate persistent occlusion as the mobile platform 1000 travels.

FIG. 9A illustrates a detail view 900 of a swivel-and-aim system 1800. Although the M2 BMG 1390 can be rigidly mounted to the cockpit 1100 and aimed by the travel direction of the mobile platform 1000, another option enables the operator 1225 to swivel the gun 1390 secured at its aft pin-mount by a strut 1810, translated by an actuation arm 1820 and rotated by a pivot-mount 1830, with the arm 1820 passing through an arc slit 1835 and attached to a pin connector within the mount 1830. This enables the gun 1390 to pitch and yaw relative to the axial centerline 140. The optical view-sight 1395 represents an annular ring around the gun barrel facing forward to receive visual signals for aiming. These features can also be applied to the 7.62 mm gun 1360.

FIG. 9B provides a planar transform view 910 of a visual display system. In similar fashion to the view 800, the lattice of triangles demarcated by lines 1560 defines the interior surface of the sphere 1500, with windows 1570 disposed within the triangle boundaries. Depiction of the windows 1570 corresponds to disposal of the gun 1390 substantially along the axial centerline 140, such as for the two-operator version, described subsequently.

The view-sight 1395 provides an annular image 1840. Pitching and/or yawing the gun 1390 enables the image 1840 to be shifted to alternate positions 1850 within an actuator-limited region 1860. The pitch and yaw motions as controlled by the operator 1225 are denoted within the region 1860 by the elevation and azimuth arrows 920.

Because the sphere 1500 obscures the exterior environment from the view-sights 1365 and 1395, their respective guns 1360 and 1390 are subject to fire into the sphere 1500 unless the projectile passes through a window 1570. Thus, the guidance unit 1240 or related equipment constrains firing commands to instances in which the projectile reaches the boundary of the sphere 1500 only when a window 1570 occurs. This may necessitate inhibition or delay of trigger actuation based on roll speed, turn rate and other factors that determine temporally-dependent positions of the windows 1570 in relation to the view-sights 1365 and 1395.

For example, FIGS. 9C through 9F show a series of time-lapse frames 930. The sphere 1500 rotates along direction arrow 1870; during this process the circumferential optical gunsight 1395 sends annular pattern of light beams 1880 (shown as an axisymmetric pair of arrows) that either reflect back to the sensor in the gunsight 1395 (double-direction-arrow) or not (single-direction-arrow). Presence of the return signal depends on whether the beam reflects off the interior of the sphere 1500 or passes through the window 1570.

In FIG. 9C, the gunsight 1395 remains completely blocked by the sphere 1500, as the window 1570 does not align to any line-of-sight. When a sufficient portion of the gunsight 1395 detects the line-of-sight through the window 1570 from the direction of rotation 1870 as in FIG. 9D, then the trigger can be alerted to fire the gun 1390. In FIG. 9E, the gun 1390 fires a bullet 1890 through the muzzle in a forward direction 1895 (for example) through an aperture introduced by passage of the window 1570. Then in FIG. 9F, the bullet 1390 passes through the window 1570 before rotation 1870 of the sphere 1500 blocks the gun's aperture again.

The respective radii of the wheels 1400 and the sphere 1500 are 7.5 inches (190 mm) and 44 inches (1118 mm). (Their corresponding circumferences are $15\pi=47$ inches and $88\pi=276$ inches.) Thus, the rotation turning ratio between wheels 1400 and the sphere 1500 is 5.9:1 based on the reciprocal of their respective radii (assuming adequate friction to avoid slip). To drive the mobile platform 1000 at 30 miles-per-hour that corresponds to 528 inches-persecond (13.2 m/sec), the sphere 1500 rolls at 115 revolutions-per-minute (rpm). Consequently, the wheels 1400 roll at 115 rpm×5.9=672 rpm. For a 60-hp 240-volt AC motor 1260 that operates at 1725 rpm, a 2.5:1 reduction gear may be employed to reduce the angular speed to the drive axle 1605.

The mass of the cockpit 1100, wheels 1400 and mechanisms 1600 of about 4000 lb moved along a wheel radius of 7.5 inches yields 2500 ft-lb. Torque T (ft-lb) is calculated for a 60-hp 240-volt motor 1260 operating at 1725 rpm by the relation T×ω÷P=c, in which w is spin (rpm), P is power (in hp) and c is constant 5252, as T=5252×60÷1725=183 ft-lb, which is about fifty-percent greater than that of an automobile on typical road grade inclines.

FIG. 10 shows a fore elevation view 940 of a two-operator configuration 1900. This version can be called Spherical Armored Mobile Tandem Operator Platform (SAMTOP). The SAMTOP employs a cockpit 1910 having less eccentricity than SAMPSON version cockpit 1100 inside same sphere 1500. The pair of operators can enter through an access door 1915 at the cockpit's top openable and latchable by a handle 1320. The SAMTOP provides tandem seating accommodations for a driver with a starboard seat 1920 and a weapon's operator with a port seat 1925. The driver and weaponeer have respective accompanying consoles 1930 and 1935. The driver is equipped with a steering yoke 1940, whereas the weaponeer uses a joystick control 1945. The driver can also have auxiliary foot pedals 1950 for acceleration control.

The SAMTOP 1900 provides for the 50 cal gun 1390 to be mounted collinear with the axial centerline 140. This version includes, drive motor 1260, exterior sensors 1370 and other equipment described for the single occupant version 1000. The SAMTOP 1900 includes substantially similar wheels 1400. Nonetheless, for additional lateral stability, to compensate for the wider distribution of mass, the cockpit 1910 includes free-roller caster wheels mounted parallel to the lateral and vertical centerlines 150 and 240. These unpowered and unsteered caster wheels turn freely when engaging the sphere 1500 and are mounted at positions for lower port 1960, lower starboard 1965, upper port 1965 and upper starboard 1975.

FIG. 11 shows a sixth starboard elevation view of a recreational version 2000 called a Geodesic Rolling Operation Vehicle (GRoOVe). Rather than armor, both the operator's cockpit and the rolling sphere have open meshes for substantially unimpeded visibility by its driver. The cockpit cage 2010 employs rollbars 2020 for protection against injury from external collision, but optionally that are disposed with gaps sufficient to permit the operator to pass therethrough. A roller frame 2030 that envelopes the cage 2010 constitutes a geodesic sphere formed with triangular frame links 2040. Additional triangular links (not shown) originating from the center of each triangle to provide traction for the wheels 1400 and augmented structural rigidity to the frame 2030.

For egress, the GRoOVe 2000 can be equipped with hatch 2050 substantially similar in configuration (albeit with mesh frame instead of shell) as the SAMPSON version 1000, with similar latching and optional hinges. The cage 2010 includes a seat 2060 for a recreational driver controlled by a joystick controller 2070. Alternatively, the GRoOVe 2000 can be controlled more typically by a steering yoke 1940 and foot pedals 1950. The GRoOVe 2000 includes a combustion engine 2080 (with accompanying fuel supply) and transmission 2090 depicted as representational blocks to provide locomotion power to the wheels 1400. Optionally, movable ballast can be incorporated to shift center-of-gravity.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A spherical armored mobile platform (SAMP) for at least one operator, said SAMP comprising:
    a spherical shell having interior and exterior surfaces, with a plurality of cavities extending therethrough;
    an armored cockpit that houses a seat, a guidance controller, a display console, and an electric motor connected to a power supply, said cockpit being contained within said shell, said seat able to receive the operator;
    a set of wheels driven by said motor and supported by said cockpit, wherein said wheels engage said interior surface and turn in response to said motor.

2. The SAMP according to claim 1, wherein said cavities are disposed within three-sided boundaries of a geodesic dome.

3. The SAMP according to claim 1, further comprising:
    a plurality of optical sensors disposed on said cockpit; and
    a signal integrator to present temporally concatenated visual signals into a mosaic at said display console.

4. The SAMP according to claim 1, further comprising:
    a gun mounted to said cockpit, said gun capable of firing a projectile; and
    a trigger control to enable actuation of said gun in response to said projectile exiting said sphere at an instance that coincides with a cavity of said plurality of cavities.

5. The SAMP according to claim 1, further comprising:
    a battery for supplying electrical power to said motor.

6. The SAMP according to claim 1, further comprising:
    a steering system for controllably turning said shell, wherein
    said set of wheels further include aft lower wheels, fore lower wheels, aft upper wheels and fore upper wheels,
    said steering system engages said fore lower wheels and said aft upper wheels.

7. The SAMP according to claim 6, wherein said motor engages said aft lower wheels.

8. The SAMP according to claim 6, wherein
    said aft lower wheels further include port and starboard aft lower wheels,
    said fore lower wheels further include port and starboard fore lower wheels,
    said aft upper wheels further include port and starboard aft upper wheels, and
    said fore upper wheels further include port and starboard fore upper wheels.

9. The SAMP according to claim 1, wherein
    said cockpit further includes a door that slides between first closed and open positions, and
    said shell includes a hatch that hinges between a second closed position and a second open position beyond said exterior surface.

10. The SAMP according to claim 1, further comprising:
shiftable trim ballast; and
a translation mechanism for controllably moving said trim ballast, said mechanism being disposed longitudinally along said cockpit.

11. A Geodesic Rolling Operation Vehicle (GRoOVe) for at least one operator, said GRoOVe comprising:
a geodesic mesh that forms a spherical shell, said mesh having interior and exterior surfaces;
an operation cage that houses a seat to receive the operator, an engine that provides torque, a transmission that transmits said torque, steering and drive controls, said cage being contained within said mesh;
a set of wheels driven by said torque from said transmission and supported by said cage, wherein said wheels engage said interior surface and turn in response to said engine.

12. The GRoOVe according to claim 11, further comprising:
a steering system for controllably turning said mesh, wherein
said set of wheels further include aft lower wheels, fore lower wheels, aft upper wheels and fore upper wheels,
said steering system engages said fore lower wheels and said aft upper wheels.

13. The GRoOVe according to claim 12, wherein said motor engages said aft lower wheels.

14. The GRoOVe according to claim 12, wherein
said aft lower wheels further include port and starboard aft lower wheels,
said fore lower wheels further include port and starboard fore lower wheels,
said aft upper wheels further include port and starboard aft upper wheels, and said fore upper wheels further include port and starboard fore upper wheels.

\* \* \* \* \*

UNITED STATES PATENT AND TRADEMARK OFFICE
CERTIFICATE OF CORRECTION

| | | |
|---|---|---|
| PATENT NO. | : 7,963,350 B1 | Page 1 of 1 |
| APPLICATION NO. | : 12/386179 | |
| DATED | : June 21, 2011 | |
| INVENTOR(S) | : Benjamin-Fausto S. Thielman et al. | |

It is certified that error appears in the above-identified patent and that said Letters Patent is hereby corrected as shown below:

Title Page;
Front Cover INID Code (75) identifying the Inventors:
 on line 3, please replace "Spotsylvania, VA (US)" with --Fredericksburg, VA (US)--.

Signed and Sealed this
Second Day of August, 2011

David J. Kappos
*Director of the United States Patent and Trademark Office*